Jan. 5, 1965   J. M. SLATER ETAL   3,164,340
INERTIAL GUIDANCE SYSTEM USING VEHICLE FIXED INERTIAL ELEMENTS
Filed March 4, 1957   5 Sheets-Sheet 1

INVENTORS.
JOHN M. SLATER
ROBERT B. HORSFALL, Jr.
BY Allen Rothenberg
ATTORNEY

INVENTORS.
JOHN M. SLATER
ROBERT B. HORSFALL, Jr.
BY Allen Rothenberg

ATTORNEY

United States Patent Office 3,164,340
Patented Jan. 5, 1965

3,164,340
INERTIAL GUIDANCE SYSTEM USING VEHICLE FIXED INERTIAL ELEMENTS
John M. Slater, Fullerton, and Robert B. Horsfall, Jr., Whittier, Calif., assignors to North American Aviation, Inc.
Filed Mar. 4, 1957, Ser. No. 644,191
19 Claims. (Cl. 244—77)

This invention relates to inertial guidance apparatus and more particularly to guidance apparatus employing a set of inertial elements which are mounted with their sensing axes in a substantially fixed relation to the frame of a vehicle to be guided.

Inertial guidance apparatus has a plurality of functions. The first function is that of sensing and integrating accelerations of a vehicle to determine velocity (the first time integral of acceleration) and usually to determine position (the second time integral of acceleration). A second function of such apparatus is the actual guidance of the vehicle which comprises the direction of the vehicle toward a predetermined destination. This function is usually achieved by detecting and correcting departures from predetermined values of velocity or position or both. The guidance apparatus is ordinarily called upon to perform an additional function, viz., furnishing flight control (autopilot) signals for the vehicle. In the case of a vehicle not equipped with inertial guidance apparatus such signals are furnished by autopilot gyros, which may be either displacement-type instruments (gyro-vertical and directional gyro) or rate instruments (airframe-fixed rate gyros) or both. But since inertial guidance apparatus by its very nature provides gyroscopic references capable of detecting changes of vehicle attitude, it is frequently convenient to rely on components of the guidance apparatus for flight control signals rather than to supply a separate set of instruments.

Inertial guidance systems typically utilize a plurality of acceleration sensing devices to measure vehicle accelerations along a set of two or more orthogonal axes and a plurality of gyroscopes to define a set of three orthogonal reference axes having some definite relation to inertial space. Inertial or unaccelerated space is in effect the space defined by the fixed stars as distinguished, for example, from the surface of the rotating earth. A computer is normally provided which takes into account earth rotation, gravity and other factors in such a manner that the outputs of the acceleration sensing devices can be interpreted correctly as changes of motion of the vehicle. Then a single integration of acceleration signals will give vehicle velocity components along a set of predetermined axes and a double integration will give displacement or distance traveled with reference to such axes.

In conventional inertial systems the gyroscopes are assembled on a device commonly designated as a stable element which is intended either to retain an angularly fixed (irrotational) relation to inertial space or alternatively, to rotate in space in some predetermined manner such as, for example, in synchronism with earth rotation. The acceleration sensing devices are mounted on the stable element and therefore sense accelerations in a coordinate system fixedly related to the element. The stable element, the assemblage of gyroscopes and acceleration sensing devices, is mounted in gimbals in order to enable it to retain its orientation in inertial space completely independently of vehicle maneuvers. The gimbal mounted stable element is commonly designated a stable platform. Typical stable platforms for inertial guidance are described in an article by J. M. Slater and D. B. Duncan, "Inertial Navigation," Aeronautical Engineering Review, volume 15, No. 1, January 1956, pg. 49.

The conventional arrangement has certain disadvantages. The stable platform is a close packed assemblage of a number of relatively large and complex elements which makes for difficulties in fabrication, adjustment and use. Furthermore, since the stable element is mounted so as to be independent of the vehicle angular motions, sets of flexible lead-in wires or slip rings must be provided to connect the various instruments to the computer power supplies and the like which are fixed to the vehicle. One-hundred or more of such lead-ins or slip rings may be required. Additionally, complicated expedients such as redundant follow up gimbals are sometimes necessary to insure that certain vehicles maneuvers do not bring the gimbal-mounted assembly into "gimbal lock" position and thereby cause tumbling and failure of the system. Gimbal lock occurs when two of the three normally orthogonal gimbal axes are brought into coincidence with the consequent loss of one degree of angular freedom. Again, since the gimbal axes coincide with the airframe axes only in straight-and-level flight, in flight control (autopilot) applications there is generally the problem of converting angular information from gimbal coordinates to airframe coordinates.

A further disadvantage of stable platforms is difficulty of alignment by optical methods. The stable element is commonly given some predetermined orientation such, as, for example, North, South, and level before takeoff or launching. It is difficult to provide windows or other communication through the wall of the missile or aircraft for access to the stable element by theodolites or other optical alignment devices on the ground. The element not only is buried in a set of gimbals but also may have arbitrary azimuth orientation relative to the vehicle frame so that an array of several mirrors on the stable element may be necessary.

The present invention overcomes the above stated disadvantages and achieves new advantages by provision of a system which obviates the need for stabilization of the instruments independent of the vehicle. The system utilizes gyroscopes and acceleration sensing devices which in themselves are or can be similar to existing ones. However, instead of utilizing such inertial elements in a space-fixed assemblage, they are mounted with their input or sensitive axes in a fixed relation to the vehicle frame. The acceleration sensing devices thus sense accelerations along axes which are fixedly related to the vehicle. The gyroscopes similarly detect angular movements of the vehicle frame relative to the input or sensitive axes of the gyroscopes. The acceleration sensing devices cannot distinguish between the desired acceleration components which are due to change of motion of the airframe and those acceleration components such as gravity and rotation of the vehicle in inertial space which are not associated with change of motion of the airframe. It is therefore necessary to provide a computer to generate signals indicative of accelerations due to gravity and due to rotation of the accelerometers in inertial space. These signals are utilized to compensate the translational motion signals derived from the acceleration sensing devices whereby the velocity components of the vehicle along its own axes are obtained. Guidance or control signals for maintaining a desired attitude of the actual vector velocity of the vehicle (as distinguished from the component of velocity along a longitudinal vehicle fixed axis) are obtained as functions of the computed velocity components along the vehicle axes and the perturbations or angular deviations of the vehicle axes relative to the gyro input axes.

Since the input or sensitive axes of the inertial elements are fixed relative to the airframe, complex gimballing and electrical lead-in problems are avoided. The assemblage of apparatus is completely maneuverable with the vehicle, with no mechanical restrictions whatsoever. In taking flight control information from the apparatus there is no problem of coordinate transformation, as in gimballed systems, since the sensing axes remain always substantially coincident with the airframe axes. Further, a much more convenient packaging of the elements is possible since they do not have to be enclosed within a set of gimbal rings. Additionally, optical alignment is facilitated since the inertial elements always have the same relation to the vehicle frame. A single window and a pair of mirrors suffice for such alignment.

It is an object of this invention to improve the mounting and construction of an inertial guidance system.

A further object of this invention is the derivation of signals indicative of translational motions of a vehicle along its own axes.

Another object is the provision of an inertial guidance system in which the only critical mechanical instruments are the inertial elements themselves, as distinguished from systems employing critical mechanical gimballing.

Still another object is the provision of an inertial guidance system wherein the inertial elements can be packed in any desired configuration which is not limited by requirements of gimbal mounting.

Still another object is the provision of an inertial guidance system which is completely maneuverable and requires no gimbals to achieve such maneuverability.

Still another object is the provision of an inertial guidance system wherein the vibratory accelerations and other conditions associated with particular vehicle axes always act in the same orientation relative to the inertial devices.

A further object of this invention is the provision of an inertial guidance system arranged to measure angular displacements of the carrying vehicle about its own principal axes whereby control signals for pitch, yaw and roll can be obtained directly from the gyroscopes without coordinate transformation.

A further object of this invention is the provision of an inertial guidance system based on acceleration sensing devices arranged to measure translational accelerations of the carrying vehicle along its own principal axes whereby control terms for acceleration or integrals thereof may be obtained directly without coordinate transformation.

Still another object of this invention is to maintain a vehicle in a predetermined flight path despite angular deviations of the vehicle from a programed attitude.

Another object of this invention is the control of the vector velocity of a vehicle in accordance with measured translational and angular motion of said vehicle along and about vehicle fixed axes.

Other objects of the invention will become apparent from the following description taken in connection with the accompanying drawings, in which.

The present invention is applicable to systems for guiding various types of vehicles such as rockets and other ballistic missiles, aircraft, torpedoes, ships and the like. However, the stated advantages regarding simplification are most outstanding in the case of systems for guiding ballistic vehicles, and the principal embodiment will be described in such an application. A ballistic vehicle is one which is powered (usually by a rocket motor) and guided only for the initial part of its flight, after which the power is cut off and the vehicle follows a trajectory determined by the laws of motion and falls on the target like a bullet. The three guidance quantities to be determined are azimuth, inclination and velocity at the time of motor cutoff. If these quantities are correctly determined, the vehicle will hit the target in the absence of possible disturbances by atmospheric effects in the unpowered portion of the flight. The function of an inertial guidance system is to insure that azimuth, inclination and the magnitude of the vehicle velocity vector are correct for the given target. Azimuth and inclination angles are measured with the aid of the gyroscopes and velocity with the aid of acceleration sensing devices in conjunction with integrators.

Figure 1:
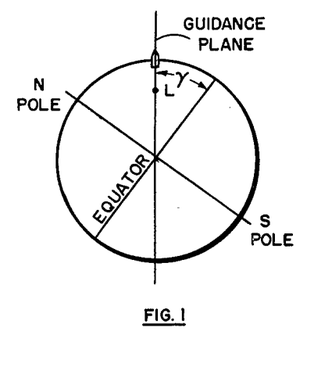
FIGS. 1 and 2 are mutually orthogonal views of a typical guidance plane coordinate system.
Figure 2:
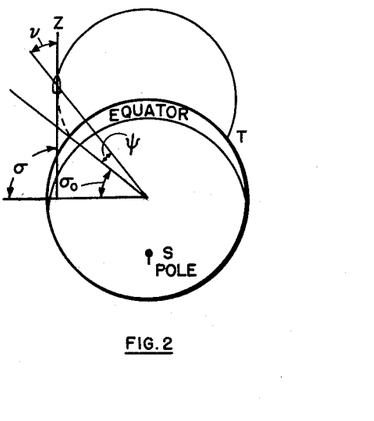

Referring to FIGS. 1 and 2, the guidance plane is defined as the plane including the launching point L, the target T and the center of the earth. It is inclined at an angle $\gamma$, between 0 and 90°, relative to the equator. The angular quantities involved in the guidance plane coordinate system are defined for present purposes as follows:

$\gamma$ = the angle of inclination of the guidance plane to the equator, $\sigma_0$ = the angle between the equator and the launching point measured along the guidance plane, $\sigma$ = the angle between the longitudinal or roll axis ($z$) of the vehicle and the equator measured along the guidance plane, $\psi$ = the range angle from the launching site to the instantaneous vehicle position measured in the guidance plane, $\mu = \sigma - \sigma_0 - \psi$ = the angle between the roll axis ($z$) of the vehicle and the local vertical.

Figure 3:
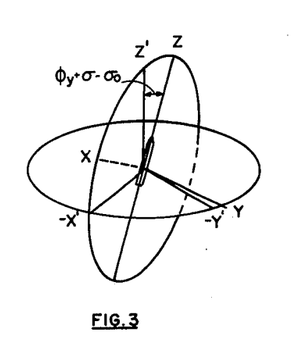
FIG. 3 illustrates the relation of a vehicle coordinate system to the guidance plane coordinate system.

Attitude and heading of the vehicle are referred to the guidance plane. As indicated in FIG. 3 rectangular coordinate systems are set up with the illustrated common origin at the center of the earth and with directions of the axes $X'$, $Y'$, $Z'$ and $x$, $y$, $z$ as follows:

$Z'$ = the line through the launching point and the center of the earth, $X'$ = the line perpendicular to $Z'$ in the guidance plane, $Y'$ = the line perpendicular to $Z'$ and $X'$, $z$ = the longitudinal or roll axis of the vehicle, $y$ = the transverse or pitch axis of the vehicle, $x$ = the vehicle yaw axis perpendicular to $y$ and $z$.

Thus it will be seen that there is provided an earth oriented inertial $X'Y'Z'$ coordinate system and a rotating, vehicle oriented $xyz$ coordinate system, the latter rotating so as to remain fixedly oriented relative to the vehicle but having an origin in common with the earth oriented system.

Angular perturbations are treated and herein defined as angular movements $\phi_x$, $\phi_y$, and $\phi_z$ about the vehicle axes $x$, $y$, and $z$, respectively. In FIG. 3 is indicated a pitch perturbation $\phi_y$ which is the angle between the $z$ axis and the reference position thereof as determined by the gyro which has its input axis along the $y$ axis. Thus, at any instant, the angle of inclination of the roll axis equals $\sigma - \sigma_0$ plus any perturbation $\phi_y$, assuming zero perturbation $\phi_x$ and $\phi_z$. In unperturbed flight, roll axis $z$ will lie in the guidance plane and will be inclined substantially at an angle $\sigma - \sigma_0$ to the launching point vertical $Z'$. Pitch axis $y$ will be horizontal and perpendicular to the guidance plane. Yaw axis $x$ will lie in the guidance plane.

Figure 4:
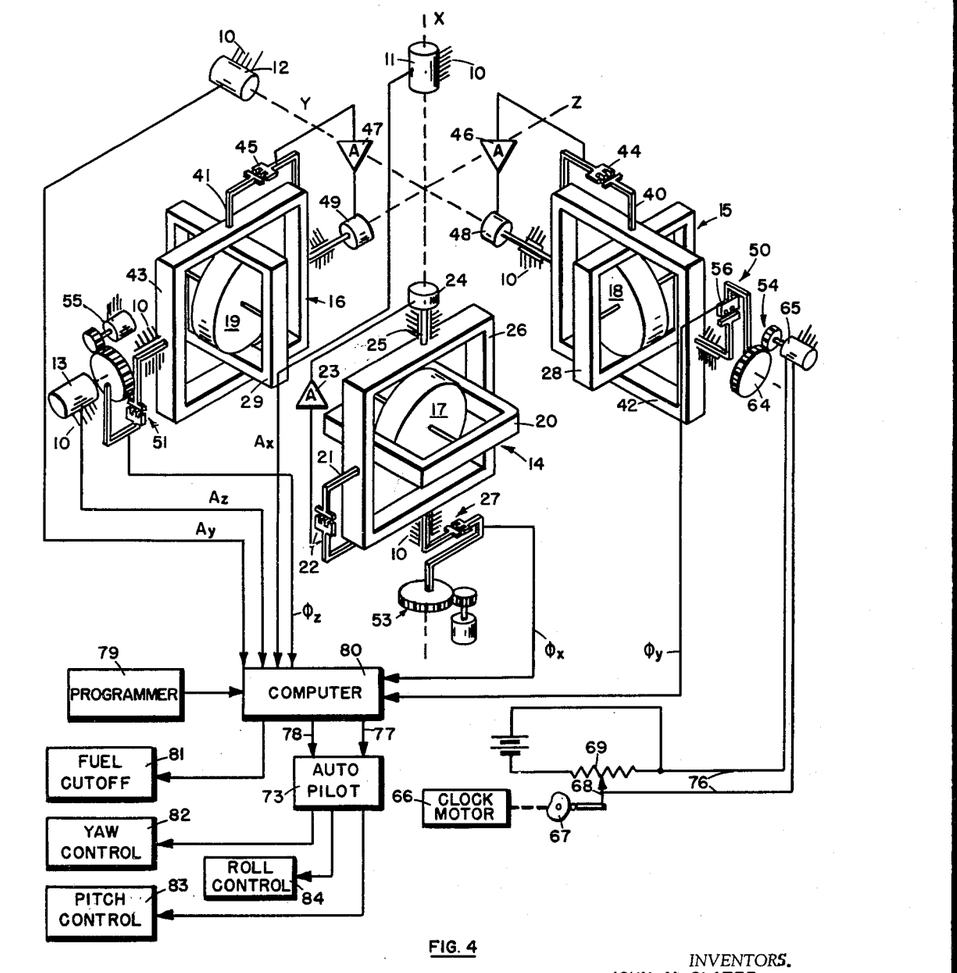
FIG. 4 illustrates a guidance system embodying vehicle fixed inertial devices.

Referring now to FIG. 4, the inertial elements of the present invention are mounted on a base member 10 which may be the vehicle itself or a separate frame, plate or case which is attached to the vehicle by means of shockmounts, if desired, in such a manner as to preserve a substantially fixed orientation of the base member relative to the vehicle. On the base member 10 are mounted three acceleration sensing devices 11, 12 and 13 with their sensing axes disposed respectively along the mutually orthogonal airframe axes $x$, $y$ and $z$. Other configurations are possible but that shown is preferred. These acceleration sensing devices may be non-integrating accelerometers or velocity meters (accelerometers combined with integrators in known ways). For purposes of illustration non-integrating accelerometers are selected. They may be of the type disclosed in the Slater and Duncan article cited above. The outputs of the accelerometers are electrical signals proportional to the respective acceleration components $A_x$, $A_y$, $A_z$ along the respective sensing axes. Also mounted on base member 10 are three single axis gyroscopes 14, 15 and 16 having rotors 17, 18 and 19, respectively. Rotor 17 of gyroscope 14 is mounted in a gimbal 20 defining an output axis 21. The pickoff 22 on axis 21 detects angle of precession about the output axis and controls through servo controller 23 the servo motor 24 on the gyroscope input axis 25 defined by outer gimbal 26 in which is mounted inner gimbal 20. In the standard nomenclature for single axis gyroscopes, the type shown herein, the support axis 21 of the gyroscope gimbal 20 is termed the output axis or precession axis. By construction, the spin reference axis, the axis of rotation of rotor 17 is established at right angles thereto. The spin reference axis is established by placement of the output axis pickoff. It is the direction of the spin axis in its normal undeflected position. The input or stabilizing axis 25 is defined as the axis at right angles to both output and spin reference axes. The single axis gyroscope tends to remain angularly fixed in space against rotation with respect to its input axis. Any disturbing torque acting about the input axis is sensed by the gyroscope and produces output axis precession which is sensed by the output axis pickoff to cause the servo system including the controller 23 and motor 24 to generate the counter torque which cancels the disturbing torque. An angle pickoff 27 on the gyro input axis detects angular departures of the vehicle or a movable index from the gyros. The pickoffs illustrated are of a limited range type which is considered adequate. If the vehicle is expected to have large angular perturbations as by reason of a slow acting autopilot, for example, there would be provided synchros or other devices capable of providing a signal which is linear for several degrees of displacement. The signal from the pickoff 27 is thus proportional to perturbation $\phi_x$.

The orthogonally oriented gyroscopes 15 and 16 are similar to gyroscope 14 and include inner gimbals 28, 29, output axes 40, 41, outer gimbals 42, 43, precession detecting pickoffs 44, 45, servo controllers 46, 47, servomotors 48, 49 and input axis pickoffs 50, 51. Thus the angle pickoffs 50 and 51 detect angular departures of the vehicle or movable index from the gyroscopes 15, 16, respectively, to provide signals respectively proportional to perturbations $\phi_y$ and $\phi_z$.

In the general case, the vehicle would be controlled through angular maneuvers of substantial magnitude relative to all three of its axes $x$, $y$, and $z$. Accordingly, angle drives 53, 54 and 55 are provided for programing large angular changes for all three gyroscopes.

Figure 6:
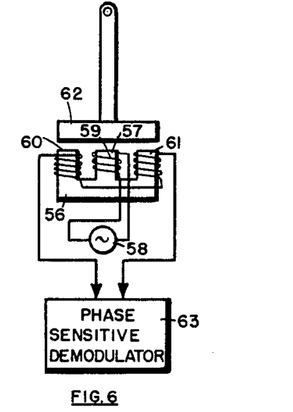
FIG. 6 illustrates a pickoff which may be used with the system of FIG. 4.

As illustrated in FIG. 6, each pickoff may comprise an E-shaped core 56 of magnetic material having a center leg 57 energized from a source of electrical energy 58 through a coil 59. Sensing coils are series wound on the outer legs 60, 61 of the core 56 to provide an induced output signal proportional to the difference between the flux flowing in the respective outer legs. An arm 62 of magnetic material is fixed to the gyro axis to move therewith relative to the outer legs of the core 56 whereby the flux difference in the outer legs is varied in accordance with the relative movement between the arm 62 and the outer legs 60, 61. The signal from the sensing coils on the outer legs of the core is fed to a phase sensitive demodulator 63 to provide a signal having a phase and magnitude in accordance with the direction and magnitude of the relation rotation between the arm 62 and the core 56. The core 56 is in effect a movable index when mounted as indicated in FIG. 4 for rotation about the gyro input axis. As indicated in FIG. 4, the movable index or pickoff core 56 is driven through gearing 64 by means of a motor 65 (gyro 15) which is energized by a programed signal. The programed signal may be obtained via leads 76 by means of a clock motor 66 driving at constant speed a cam 67 which has the surface thereof formed in accordance with the desired programed angle. In the program drive for the gyroscope 15, the program angle is the elevation angle $\sigma - \sigma_0$. The cam 67 drives wiper 68 of a potentiometer 69 to provide the motor 65 with the desired program signal. It is to be understood that the disclosed programing apparatus is exemplary only of one of many functionally similar programing arrangements which are well known to those skilled in the art.

In the case of ballistic missiles, the type here under consideration, the angular movements about axes $x$ and $z$ are ordinarily kept small or zero on the average by proper control of the missile flight by a conventional autopilot and the only wide range of angular movement is that about the $y$ axis. This movement is pitching motion which is involved in tilting the vehicle from its initial vertical position at launching to the proper inclination for the selected trajectory. Therefore, for such a ballistic vehicle there is not shown nor is there required the programing drive for the pickoffs 27 and 51 of gyros 14 and 16.

Computer 80, more particularly described below, receives the signals $A_x$, $A_y$, $A_z$ from the accelerometers and the signals $\phi_x$, $\phi_y$, and $\phi_z$ from the gyroscope input axis pickoffs and provides as the outputs thereof pitch and yaw steering signal components at leads 77, 78 and a fuel cutoff signal to turn off the vehicle motor when a predetermined vehicle velocity has been reached. The fuel cutoff signal is fed to fuel control apparatus 81, the details of which form no part of this invention. The steering control signal components are combined with or superposed upon steering signals derived from a conventional autopilot 73. The autopilot actuates yaw control apparatus 82, pitch control apparatus 83, and roll control apparatus 84, which may conventionally comprise valves, actuators, controlling vanes, aerodynamic surfaces or servos on movable rocket motors as is well known in the art. It is to be understood that the conventional autopilot itself may embody roll, pitch and yaw sensing gyros from which are derived short period roll, pitch and yaw control of the vehicle as is well known to those skilled in the art. The details of such autopilot are not the subject of this invention since the yaw and pitch steering signal components which are derived from computer 80 merely add long period control components to the short period autopilot control.

Figure 9:
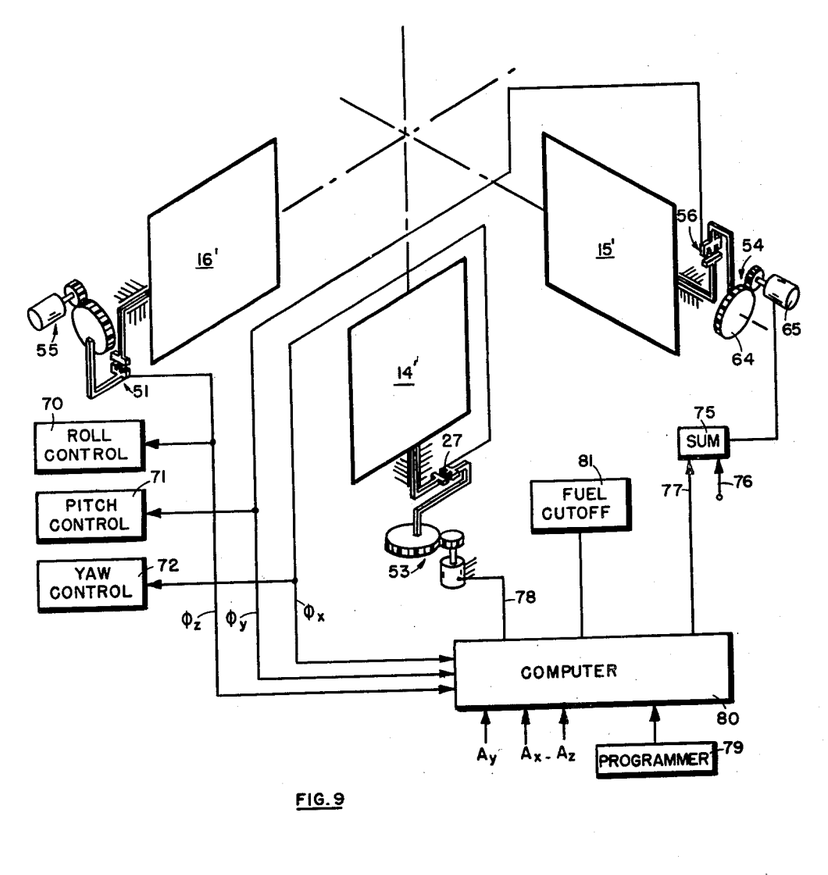
FIG. 9 illustrates the combination of the guidance system of this invention with an autopilot.

However, since the gyros 14, 15, 16 are inherently capable of providing the desired short period control information required of the conventional autopilot (for stabilization of the vehicle against gusts, etc.) it is preferable to utilize a single set of gyros to perform the dual functions of providing the perturbation signals to the computer 80 and to provide the short period control signals. Indicated in FIG. 9 is such an arrangement wherein the system of FIG. 4 is combined with an autopilot of the type disclosed in FIG. 3 of Patent No. 2,649,-264 for "Flight Control Systems" issued August 18, 1953, to J. M. Slater et al. In the arrangement of FIG. 9, gyros 14', 15' and 16' may be structurally and functionally similar to gyros 14, 15 and 16 of FIG. 4. As previously described, the input axis pickoffs 27, 56 and 51 provide the signals $\phi_x$, $\phi_y$, $\phi_z$ to computer 80 which also receives the signals $A_x$, $A_y$, $A_z$ and the programed coefficients from programer 79. As before, the computer provides a fuel cutoff signal and the long period pitch and yaw steering control signals via leads 77 and 78. The gyros 14', 15', 16' may also be structurally and functionally similar to gyros 188, 185 and 161, respectively, of FIG. 3 of the aforementioned patent and comprise autopilot components corresponding to gyros 188, 185 and 161 of the autopilot shown therein. The signals from input axis pickoffs 51, 56 and 27 (functionally similar to pickoffs 162, 186 and 189 of the patent) may be fed to roll, pitch and yaw servo systems 70, 71, 72 of the type described in the patent. It is to be understood that such servo systems may actuate control elements other than aerodynamic surfaces such as, for example, swiveled rocket motors, jet vanes, or the like.

The long period pitch and yaw steering signals from computer 80 are fed via leads 77, 78 to control angle drives 54 and 53 which rotate pickoffs 56 and 27 to thereby superpose long period control components on the short period control signals derived from gyros 15' and 14'. In the pitch control channel where a programed inclination is desired, the signal from leads 77 is combined in summing network 75 with the programed pitch signal from leads 76 to drive motor 65 in accordance with both the programed and computer derived pitch information. Thus, for example, if the computer calls for a yawing movement to correct a velocity or geographical position error, it adjusts the yaw gyro input-axis pickoff 27 to cause the vehicle to turn. Short-period effects due to gusts, etc., which merely change the attitude or direction of the vehicle, not its velocity or geographical position, are thus handled entirely by gyro-control-servo systems functioning like a conventional autopilot such as that of Patent No. 2,649,264, for example. The computer output would be zero for such short-period effects. Long-period effects, which actually change the velocity or geographical position of the vehicle are corrected by the superposed control from the computer.

The computer also receives as inputs from programer 79 a plurality of programed coefficients to be more particularly described hereinafter. Each of such coefficients may comprise an electrical signal which varies with time in a predetermined manner and is derived from a programing apparatus which is substantially similar to the elevation angle programing (FIG. 4) which provides a signal to motor 65 associated with gyro 15.

Figure 5:
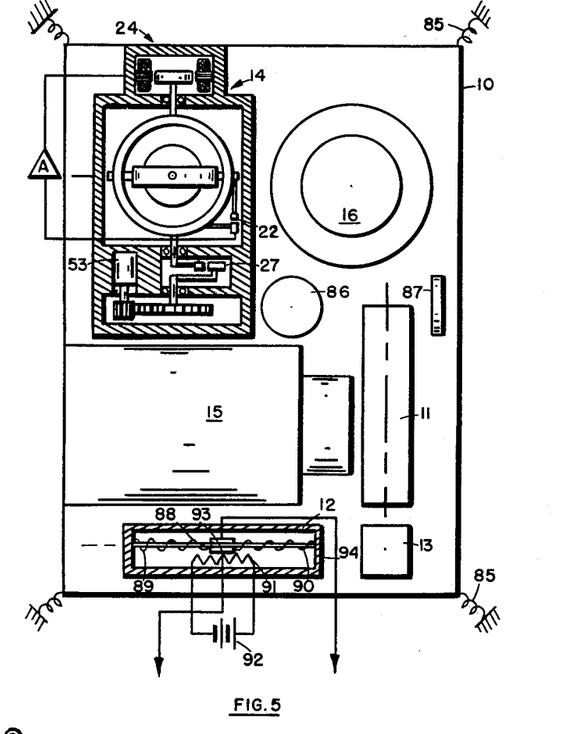
FIG. 5 illustrates, partly in section, an exemplary assemblage of vehicle fixed inertial devices.

Referring now to FIG. 5 there is shown a typical arrangement of inertial elements. The disclosed arrangement is intended for the purpose of illustration rather than limitation since one of the advantages of the invention is the flexibility and freedom of choice not only in selection of the inertial elements but also in their mounting. The base member 10 may be a rigid member such as a metal casting which is supported by shock-mounts 85 in substantially fixed relation to the vehicle frame. The accelerometers 11, 12, and 13 and gyroscopes 14, 15, and 16 may be fixedly secured to the base member 10 in the exemplary arrangement indicated. A pair of mutually orthogonal mirrors 86, 87, fixed to the base member permit a three axis initial alignment by optical apparatus (not shown) on the ground. As indicated in connection with accelerometer 12, each accelerometer may comprise a mass 88 slidably constrained for movement along the sensing axis by a bar 89 and spring restrained by spring 90. Potentiometer 91 is energized by a suitable source of potential 92 and includes a wiper 93 which is fixed to mass 88 whereby a voltage proportional to sensed acceleration may be derived from leads connected respectively to the wiper 93 and a center tap of potentiometer 91. The accelerometer case 94 may be filled with a suitable liquid to provide for damping. Assuming linearity of the spring and pickoff and negligible friction, the output voltage is proportional to acceleration.

As indicated above, the accelerometers provide signals which include acceleration components which are due to the change of the inertial velocity vector of the vehicle as observed from the rotating coordinate system (the vehicle oriented system) and also include acceleration components due to gravity and the effects of the angular velocity of the rotating coordinate system in inertial space, $(\bar{\omega} \times \bar{V})$. For the purpose of this discussion a coordinate system which is non-rotating relative to the fixed stars and whose center is at the center of the earth is considered as an inertial system. The vector equation which expresses these acceleration components in an inertial system is $$\bar{A} = \dot{\bar{V}} + \bar{g} = \frac{\delta \bar{V}}{dt} + (\bar{\omega} \times \bar{V}) = \bar{g} \quad (1)$$

Where $\bar{A}$ is the inertial acceleration vector and $\bar{V}$ is the inertial velocity vector of the vehicle, $\bar{g}$ is the acceleration vector of gravity, $\bar{\omega}$ is the angular velocity of the rotating coordinate system in inertial space and the notation $\delta \bar{V}/dt$ is used for convenience to denote the time rate of change of the inertial velocity vector of the vehicle as observed from the rotating (vehicle oriented) coordinate system. This quantity $\delta \bar{V}/dt$ is the sum of the products of the time derivatives of the magnitudes of the components of the velocity vector $\bar{V}$ times the unit vectors directed along the rotating system axes, and may be expressed as $$\frac{\delta \bar{V}}{dt} = \dot{V}_x \bar{1}_x + \dot{V}_y \bar{1}_y + \dot{V}_z \bar{1}_z \quad (2)$$

Where $\dot{V}_x$, $\dot{V}_y$ and $\dot{V}_z$ are the first time derivatives of the magnitudes of the components of the velocity vector $\bar{V}$ along the respective axes $x, y, z$ and the symbol $\bar{1}$ with a subscript indicates the unit vector along the axis designated by the particular subscript thereof. The cross product of $\bar{\omega}$ and $\bar{V}$ which is written as $(\bar{\omega} \times \bar{V})$ indicates the vectorial acceleration due to rotation of the vehicle oriented rotating coordinate system in inertial space (i.e., vectorial acceleration of rotation or vector cross product of rotary and translational velocities). The quantity $\bar{\omega}$ includes the angular velocity of the earth's rotation, the time rate of change of programed inclination and the rate of change of angular perturbation and may be expressed as $$\bar{\omega} = \bar{1}_Y \Omega + \bar{1}_{y'} \dot{\sigma} + \dot{\bar{\phi}} \quad (3)$$

where $\Omega$ is the angular velocity of the earth about its axis Y which is related to the guidance plane coordinate system axis Y' by the angle $\gamma$, $y'$ is the programed vehicle pitch axis and differs from the perturbed vehicle pitch axis $y$ by the angle $\phi_y$, $\dot{\sigma}$ is the time rate of change of $\sigma$ and $\dot{\bar{\phi}}$ is the time rate of change of vector perturbation. In the present invention we are concerned with obtaining the velocity components along the vehicle axes as indicated by Equation 2. It will be seen from Equation 1 that these desired velocity components may be obtained by modifying the acceleration component signals derived from the acceleration sensing devices by vector quantities indicative of components of gravitational acceleration and acceleration components due to earth's rotation, programed inclination and perturbation. Accordingly, the desired velocity vector may be expressed as $$\frac{\delta \bar{V}}{dt} = \bar{A} - (\bar{\omega} \times \bar{V}) - \bar{g} \quad (4)$$

In effect the present invention biases or modifies the acceleration sensing devices or their outputs in accordance with the second two quantities on the right-hand side of Equation 4.

Writing and integrating the Cartesian equations corresponding to Equation 4 utilizing the relationship between the position of the perturbed vehicle axes and the inertial reference axes about which angular velocities and the gravitational vector may be directly expressed, we may obtain the following relations $$V_x = \phi_y V_z \Big|_0^T + \phi_z V_y \Big|_0^T + \int_0^T \Big[ A_x - M_1 V_z + \phi_y \dot{V}_z - \dot{\phi}_z V_y$$
$$+ M_2 M_{10} - M_3 (M_{11} - \phi_y M_{10}) - M_7 \Big] dt \quad (5)$$

$$V_y = -\phi_z V_x \Big|_0^T + \phi_x V_z \Big|_0^T + \int_0^T [A_y + M_4 V_z + M_5 \phi_z V_z$$
$$+ \dot{\phi}_z V_x - \dot{\phi}_x V_z - M_2 \phi_z M_{10} - M_3 \phi_x M_{10} - M_6 R_y - M_8] dt \quad (6)$$

$$V_z = -\phi_x V_y \Big|_0^T + \phi_y V_x \Big|_0^T + \int_0^T [A_z + M_5 V_x + \phi_x \dot{V}_y - \dot{\phi}_y V_x$$
$$- M_3 M_{10} - M_2 (M_{11} - \phi_y M_{10}) - M_9] dt \quad (7)$$

Where:

$M_1 = \Omega \cos \gamma + \dot{\sigma}$
$M_2 = g_R \sin \delta$
$M_3 = g_R \cos \delta$
$M_4 = \Omega \sin \gamma \cos \sigma$
$M_5 = \dot{\sigma}$
$M_6 = g_{R/R}$
$M_7 = g_N \cos \alpha \cos \mu$
$M_8 = g_N \sin \alpha$
$M_9 = g_N \alpha \sin \mu$
$M_{10} = \cos \psi$
$M_{11} = \sin \psi$
$\alpha =$ the geographical azimuth of the horizontal projection of the vehicle $z$ axis measured from north
$g_R =$ the radial component of gravitational acceleration
$g_N =$ the northerly component of gravitational acceleration (ellipticity effect)
$\delta = \sigma - \sigma_0$
$R =$ the radius from the center of the earth
$R_y =$ the integral of $V_y$ The quantities $M_1$ through $M_{11}$ are the coefficients which may be preprogramed in programer 79 of FIG. 4 as inputs to computer 80. Equations 5, 6 and 7 are expressed in terms of the perturbation angles $\phi$ rather than in terms of perturbation rates $\dot{\phi}$ in view of the fact that, in the present state of the art, it is more difficult to obtain rate values with adequate accuracy. Equations 5, 6 and 7 are derived on the basis of the assumption that the attitude control system of the vehicle (the conventional autopilot) will be sufficiently good to permit treatment of the attitude perturbations $\bar{\phi}$ as a small vector quantity.

If we designate $V_T$ as the required speed at cutoff at time $T$ and $\theta$ as the corresponding zenith angle of the trajectory, the guidance criteria may be written as (fuel cutoff control) $V_T - V_z = \delta V \to 0$ (8)
(pitch steering) $V_T \phi_y - V_x = \epsilon_y \to 0$ (9)
(yaw steering) $V_T \phi_x - V_y = \epsilon_x \to 0$ (10)
(programed inclination) $\sigma - \sigma_0 \to \theta$ as $\tau \to T$ (11)

Figure 7:
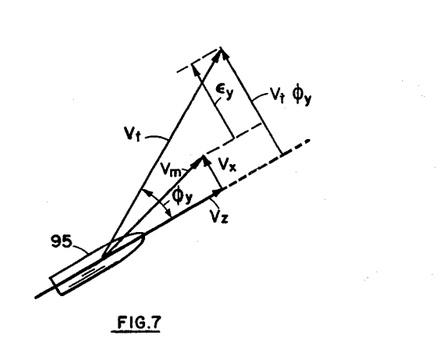
FIG. 7 illustrates the derivations of vehicle guidance criteria.

The derivations of Equations 9 and 10 are made with reference to FIG. 7 where the vehicle 95 has a velocity vector comprising the velocity component $V_z$ and the velocity component $V_x$ neglecting for the moment the velocity component $V_y$. The programed vechicle velocity is $V_T$ whereby, by definition, the perturbation $\phi_y$ about the pitch axis $y$ is equal to the angle between $V_T$ and $V_z$. The actual vehicle velocity in the $xz$ plane is the vector sum of $V_x$ and $V_z$ and differs by $\epsilon_y$ from the desired vehicle velocity vector $V_T$. This error component $\epsilon_y$ is equal to the $x$ component of the desired velocity, $V_T \phi_y$, the $x$ component of vehicle velocity as indicated by Equation 9. Thus, if a steering signal proportional to $\epsilon_y$ is fed in a proper sense to the missile pitch controls, the actual vehicle velocity vector $V_M$ will be brought into coincidence with the desired velocity $V_T$ despite the fact that the longitudinal axis of the vehicle may still deviate angularly from the actual velocity heading due to aerodynamic factors which may cause sideslip. The signal $\epsilon_y$ appears at computer output leads 77. The missile yaw control signal $\epsilon_x$ which appears at computer output leads 78 is derived by means of considering geometry similar to that of FIG. 7 in the $yz$ plane. The criteria derived in connection with FIG. 7 hold particularly at cutoff when the desired velocity $V_T$ is actually at its programed value. The steering control signals are, however, derived throughout the powered and guided portions of the vehicle flight when the desired velocity $V_T$ may have a much greater magnitude than the actual vehicle velocity. This situation will tend to cause the steering control signal to be too large. If the control signal should tend to become too great, suitable limits or stops on the steering controls may be provided although in many instances the larger control signal will yield greater sensitivity.

It will be seen that the described guidance system performs two main functions in addition to the provision of corrected accelerometer signals from vehicle fixed instruments. One is that of maintaining the vehicle on the predetermined flight path. In the described embodiment this is effected by deriving steering control signal components which take into account the vehicle sideslip or the difference between the actual direction of vehicle travel and the longitudinal vehicle axis. The second function of the described embodiment is the derivation of a control signal in accordance with Equation 8 which cuts off the vehicle power when the programed velocity $V_T$ is reached. These criteria are sufficient to provide adequate accuracy if the flight path control is sufficient to insure negligible translational departures (position errors) from the predetermined flight path. If greater accuracy were desired, as in the case of vehicles of greater range, a suitable position computer might be provided for interpreting the integral of the velocity signals obtained in accordance with Equations 5, 6 and 7 in terms of a space fixed or earth fixed coordinate system. The position computer would provide signals to the autopilot and motor control to either correct the translational departures of the vehicle or to adjust inclination, heading and velocity at cutoff to compensate for computed position errors.

For many purposes and particularly in vehicle of shorter range, position errors may be kept sufficiently small to be neglected by maintaining coincidence of the predetermined vehicle velocity vector with the actual vehicle velocity vector. As indicated above, the actual vehicle velocity vector $V_M$ may not be directed along the vehicle $z$ axis due to various aerodynamic forces on the vehicle. Therefore, it is not sufficient to control the $z$ axis heading and inclination. For this reason the present invention provides pitch and yaw signal components proportional to $V_T \phi_y - V_x$ and $V_T \phi_x - V_y$. The perturbations $\phi_y$ and $\phi_x$ are measured essentially from spatially fixed gyro input axes. In the case of $\phi_y$, however, the perturbation is actually measured from a reference which moves in accordance with the programed inclination.

With the actual vehicle velocity $V_M$ in coincidence with the desired vehicle velocity $V_T$, the fuel cutoff control signal is actually proportional to $V_T \cos \phi - V_z$ which yields Equation 8 for the assumed small values of $\phi$ which make the cosine of the angle equal to unity.

Figure 8:
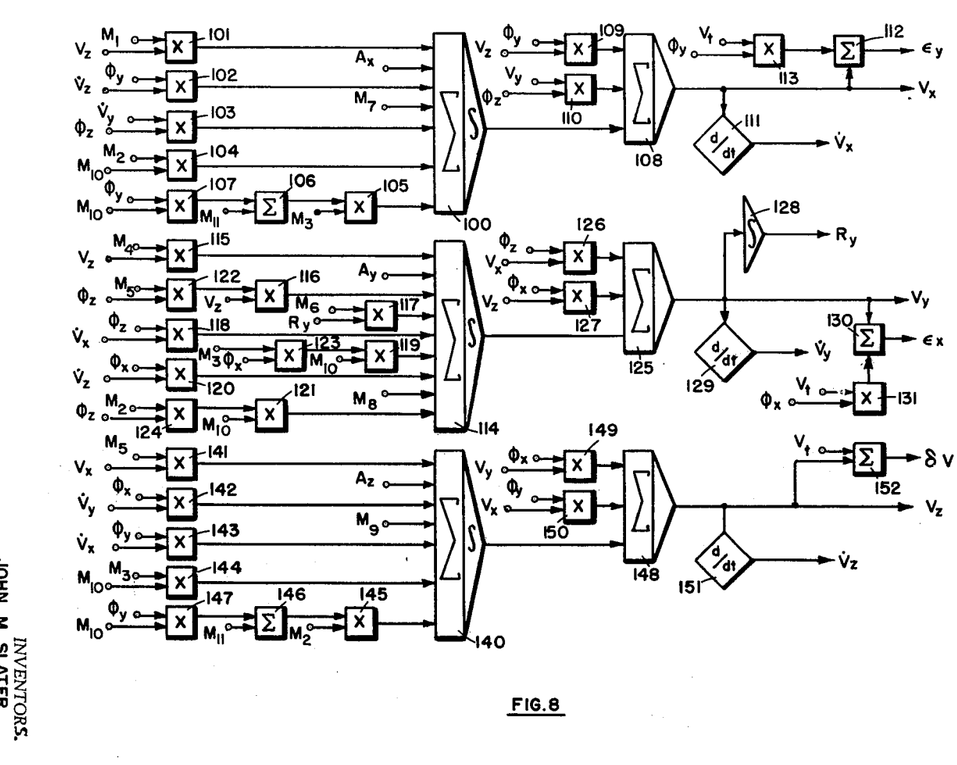
FIG. 8 is a block diagram of a computer which may be utilized in the system of FIG. 4.

Indicated in FIG. 8 is a block diagram of the computer 80 of FIG. 4 which mechanizes Equations 5, 6, 7, 8, 9 and 10. The computer channel which mechanizes Equation 5 comprises a summing and integrating amplifier 100 which receives as inputs thereto the signal $A_x$ from accelerometer 11, the signal indicative of $M_7$ from programer 79 and the outputs of a plurality of conventional multipliers 101 through 105. The inputs to multipliers 101 through 104 are as indicated in the drawing and the multiplier in each case provides a signal which is proportional to the product of the two inputs thereof. The input to multiplier 105 comprises coefficient $M_3$ and the output of a summing network 106 which receives as the inputs thereto the coefficient $M_{11}$ and the output of multiplier 107 having inputs $\phi_y$ and $M_{10}$ as indicated. The computer components 105, 106, and 107 provide as the output of multiplier 105 the quantity $M_3$ $(M_{11}-\phi_y M_{10})$. The output of multiplier 107 is the product of $\phi_y$ and $M_{10}$. The difference between $M_{11}$ and the aforementioned product is the output of summing network 106 which is multiplied by $M_3$ in multiplier 105. The summing and integrating amplifier 100 provides as its output a signal proportional to the integral of the sum of the inputs thereto. This signal from amplifier 100 is fed to summing amplifier 108 together with the outputs of multipliers 109 and 110 which provide output signals indicative of the product of inputs thereto respectively. The output of summing amplifier 108 is thus a signal proportional to the desired component of velocity along the $x$ axis. The output quantity $V_x$ is fed to a differentiator 111 which provides as its output the quantity $\dot{V}_x$. The output quantities $V_x$ and $\dot{V}_x$ are fed back (by connections not shown) to the inputs of the several multipliers as indicated. As described above the coefficient $M_7$ is derived by preprograming from the programer 79 while the $A_x$ signal and the $\phi$ signals are derived from the inertial elements. In order to provide the pitch steering signal $\epsilon_y$, the output quantity $V_x$ is fed to summing network 112 together with the output of multiplier 113 which has as the inputs thereto the signals indicative of the quantities $\phi_y$ and $V_T$. The output of summing network 112 is then the difference as defined by Equation 9. The input $V_T$ is a preprogramed constant.

The $y$ component computer channel which includes the mechanization of Equation 6 comprises a summing and integrating amplifier 114 which receives as the inputs thereto the signal $A_y$ from accelerometer 12, preprogramed constant $M_8$ and the outputs of multipliers 115 through 121 which provide outputs proportional to the products of the indicated inputs thereto, respectively. The inputs to multiplier 116 comprise a signal indicative of $V_z$ and the output of multiplier 122. The inputs to multiplier 119 comprise a signal indicative of $M_{10}$ and the output of multiplier 123 while the inputs to multiplier 121 comprise a signal indicative of $M_{10}$ and the output of multiplier 124. The output of integrating amplifier 114 is fed to summing amplifier 125 together with the outputs of multipliers 126 and 127. The sum of these quantities, the output of amplifier 125, is the quantity $V_y$ which is integrated in integrating amplifier 128 to provide the signal $R_y$ and differentiated in differentiator 129 to provide the signal $\dot{V}_y$. The quantities $R_y$, $V_y$, and $\dot{V}_y$ are fed back to the computer inputs at the points indicated. The quantity $V_y$ is fed to summing network 130 together with the output of multiplier 131 to provide the quantity $\epsilon_x$ in accordance with Equation 10. This is the yaw steering signal which appears at computer output leads 78. The inputs to multiplier 131 comprise the signal $\phi_x$ from gyroscope 14 and the programed constant $V_T$.

The mechanization of Equation 7 is effected by the $z$ component channel of computer 80 which comprises a summing and integrating amplifier 140 providing an output proportional to the integral of the sum of the inputs thereto. The inputs to amplifier 140 comprise the outputs of multipliers 141 through 145, the signal $A_z$ from accelerometer 13 and preprogramed coefficient $M_9$. The output of multiplier 145 is the product of the preprogramed coefficient $M_2$ and the output of summing network 146 which comprises the difference between coefficient $M_{11}$ and the product of the inputs to multiplier 147. The output of summing and integrating amplifier 140 is fed to summing amplifier 148 together with the outputs of multipliers 149, 150, which comprise, respectively, the products of the indicated inputs to the multipliers. The output of summing amplifier 148 is the $z$ velocity component $V_z$ which is fed to dieffrentiator 151 to provide the $z$ velocity rate signal $\dot{V}_z$. The fuel cutoff control signal $\delta V$ is derived from summing network 152 which provides an output proportional to the difference between $V_T$ and $V_z$, the inputs thereto. The signals $V_z$ and $\dot{V}_z$ are fed back to the inputs of the computer at the indicated points while the signal $\delta V$ is fed to the fuel cutoff apparatus 81 as indicated in FIG. 4.

The computer disclosed is intended for purposes of exposition and is but one of many possible configurations for the mechanization of Equations 5 through 10 as will be readily apparent to those skilled in the art. It will be seen that essentially the computer modifies or biases the acceleration sensing devices or the outputs thereof to compensate for gravitation and the cross product of the angular velocity of the rotating coordinate system of the vehicle in inertial space and the vehicle velocity vector. The modifying or biasing function of the computer includes the compensation for the gyroscope derived perturbation signals by virtue of the use of the $\phi$ signals in the computations. Thus, the disclosed system utilizes vehicle fixed inertial devices to provide translational motion or velocity signals directly proportional to the velocity components of the vehicle to be guided irrespective of perturbations, gravitational acceleration and other accelerations not associated with changes of motion of the vehicle.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination with a vehicle, gyroscopic means carried on the vehicle in substantially fixed relation to a set of axes fixedly oriented with respect to said vehicle for detecting angular motion of the vehicle about said axes, inertial means fixedly mounted on said vehicle for detecting translational accelerations along said axes fixed with respect to said vehicle, and means for modifying the output of said inertial means to compensate for the angular velocity of said vehicle relative to inertial space, said modifying means being responsive to said gyroscopic means for effecting modification of the output of said inertial means in accordance with the vector cross-product of angular and translational velocities of said vehicle.

2. A guidance system comprising a vehicle adapted to move with a combination of translational and angular velocities, a set of accelerometers fixedly mounted in said vehicle for generating signals indicative of the translational acceleration of said vehicle along a set of axes fixedly oriented with reference to said vehicle, and means for modifying said signals in accordance with the cross-product of the angular and translational velocities of said vehicle in inertial space.

3. The structure of claim 2 wherein said modifying means includes gyroscopic means for generating signals indicative of angular perturbations of said vehicle, and computer means responsive to said accelerometers and gyroscopic means for generating compensatory signals indicative of the vector cross product of vehicle angular velocity and vehicle translational velocity and for combining said compensatory signals with said translational motion signals.

4. The structure of claim 2 wherein said modifying means includes means for modifying said translational acceleration signals in accordance with angular perturbations of said vehicle and accelerometers.

5. In a vehicle guidance system, a set of accelerometers having mutually orthogonal input axes fixedly related to said vehicle for generating a signal $\overline{A}$ indicative of the acceleration vector of said vehicle, and compensating means for modifying said signal in accordance with a quantity $(\bar{\omega} \times \bar{V} + \bar{g})$ where $\bar{g}$ is the acceleration vector of gravity, $\bar{V}$ is the velocity vector of said vehicle, and $\bar{\omega}$ is the angular velocity vector of said vehicle in inertial space and includes an angular velocity component indicative of angular perturbations of said vehicle.

6. The system of claim 5 wherein said compensating means comprises a set of gyroscopic devices for detecting angular perturbations of said vehicle about a set of axes fixedly related thereto, computing means, and means for feeding the outputs of said accelerometers and gyroscopic devices to said computing means.

7. A vehicle guidance system comprising support means adapted to be fixedly mounted in a vehicle to be guided, inertial means on said support means for sensing translational accelerations of said support means along each of a set of mutually orthogonal axes fixedly oriented relative to said support means, gyroscopic means for generating perturbation signals indicative of angular perturbations of said support means about each of said axes, means including said inertial and gyroscopic means for biasing said inertial means to generate velocity signals respectively indicative of velocity components of said support means along said axes, means for generating a desired signal indicative of a desired velocity of said vehicle substantially along a first one of said axes, and means for generating a control signal as a predetermined function of the difference between the signal indicative of velocity component along a second one of said axes and the product of said desired signal with the signal indicative of perturbation about a third one of said axes.

8. The system of claim 7 including means for generating a second control signal as a predetermined function of the difference between the signal indicative of velocity component of said support means along said third axis and the product of said desired signal with the signal indicative of perturbation about said second axis.

9. A vehicle guidance system comprising support means adapted to be fixed to a vehicle to be guided and adapted to be subjected to angular perturbations of said vehicle, sensing means carried in substantially fixed relation to said support means for generating translational and rotational signals respectively indicative of accelerations and angular perturbations of said support means along and about first, second and third mutually orthogonal axes fixedly oriented relative to said support means, computer means responsive to said sensing means for generating velocity signals respectively indicative of velocity components of said support means along each of said axes, said computer means comprising means for compensating said sensing means to modify said translational signals in accordance with angular velocity of said support means in inertial space, and means responsive to said modified translational signals and said rotational signals for generating vehicle control signals.

10. A vehicle, a base fixedly oriented relative to said vehicle, inertial means including a set of acceleration sensing devices fixedly mounted on said base and a set of gyroscopes, said set of gyroscopes including a plurality of mutually orthogonal gyroscopes each having gimbal means defining an output axis normal to its spin reference axis, means for supporting said gimbal means for angular freedom relative to said base about an input axis normal to both said spin reference and output axes, pickoff means for sensing precession about said output axis, torquer means on said input axis, means responsive to said pickoff means for actuating said torquer means in a sense to maintain the spin reference axis normal to the input axis, means for deriving signals indicative of the angular perturbations of said base relative to each input axis, said set of acceleration sensing devices comprising a number of sensing devices having mutually orthogonal sensing axes, computer means responsive to said acceleration sensing devices and to said angular perturbation signals for correcting said acceleration sensing devices in accordance with the cross-product of angular and translational velocities of said vehicle, and controller means responsive to said inertial means and computer means for varying vehicle azimuth and attitude to maintain the angular rotation of said vehicle substantially at zero despite transient angular perturbations about said input axes whereby the vehicle azimuth and attitude are maintained substantially in a known relation to inertial space as determined by said gyroscopes.

11. The system of claim 10 wherein said means for deriving perturbation signals includes a displaceable index whereby a desired rotation of the vehicle in inertial space may be programed.

12. In a vehicle guidance system a set of three mutually orthogonal gyroscopes each having gimbal means defining an output axis normal to the spin reference axis thereof, means for supporting said gimbal means to give angular freedom relative to a vehicle about an input axis normal to both the spin reference and output axis, a precession sensing pickoff on the output axis of each gyroscope, a torquer on the input axis of each gyroscope, controller means for actuating each torquer in a sense to reduce precession angle so as to keep each spin reference axis normal to the associated input axis, angular measuring means for deriving a signal indicative of the angular rotation of the vehicle about each input axis, a set of three acceleration sensing devices mounted on said vehicle with mutually orthogonal input axes, computer means responsive to said angular measuring means for generating biasing signals indicative of gravitational acceleration and other accelerations due to the cross-product of angular and tranlational velocities of said vehicle, and said computer means comprising means for biasing said acceleration sensing devices in accordance with a predetermined function of said biasing signals.

13. In a vehicle guidance system, a set of three acceleration sensing devices mounted in substantially fixed relation to said vehicle said devices having mutually orthogonal sensing axes, gyroscopic means for sensing angular perturbations of said vehicle in inertial space about three mutually orthogonal axes, and computer means responsive to said acceleration sensing devices and to said gyroscopic means for generating signals indicative of velocity components of said vehicle along a set of axes fixedly oriented relative to said vehicle and compensated for gravity and the vector acceleration of rotation of said vehicle.

14. In combination with a vehicle to be guided, a set of three mutually orthogonal translational accelerometers fixed to said vehicle in a predetermined unvarying orientation with respect thereto, said accelerometers having outputs representing vehicle accelerations along a set of axes fixedly oriented with respect thereto, a set of gyroscopes on said vehicle having outputs representing angular deviation of said vehicle about said axes, and computer means responsive to said gyroscope outputs and to said accelerometers for combining with the outputs of said accelerometers signal components representing gravity and the vectorial acceleration of rotation of said vehicle in inertial space.

15. A guidance system for a vehicle comprising a set of accelerometers fixedly mounted to said vehicle, a set of gyroscopes on said vehicle, computer means having inputs from said accelerometers and gyroscopes for generating accelerometer correction signals substantially proportional to the vector cross-product of rotational and linear velocities of said vehicle in inertial space, said computer means including means for combining the outputs of said accelerometers with said correction signals so as to produce signals indicative of the linear velocity of said vehicle in a coordinate system fixedly oriented relative to said vehicle.

16. In combination with a vehicle mounting a plurality of gyroscopes which have output signals indicative of short period angular deviations of said vehicle from a set of axes defined by said gyroscopes; a plurality of accelerometers fixedly mounted to said vehicle; computer means responsive to the outputs of said gyroscopes and accelerometers for generating long period control signals indicative of the vehicle linear vector velocity; and means for controlling the attitude of said vehicle in response to both said gyroscope output signals and said long period control signals.

17. In combination with a vehicle having an autopilot including a plurality of gyroscopes which have output signals indicative of short period angular deviations of said vehicle from a set of axes defined by said gyroscopes; a plurality of accelerometers fixedly mounted to said vehicle; computer means responsive to the outputs of said gyroscopes and accelerometers for generating long period control signals indicative of deviation of the vehicle linear vector velocity from a predetermined value thereof; and means for controlling the attitude of said vehicle in response to both said gyroscope output signals and said long period control signals.

18. A guidance system comprising a vehicle adapted to move with a combination of tranlational and angular motion, a set of accelerometers fixedly mounted in said vehicle for generating signals indicative of the translational acceleration of said vehicle along a set of axes fixedly oriented with reference to said vehicle, gyroscopic means for generating signals indicative of angular deviation of said vehicle, and computer means responsive to said gyroscopic means for modifying the output of said accelerometers in accordance with the acceleration due to rotation of said vehicle in inertial space.

19. For use on a vehicle adapted to move with a combination of translational and angular velocities, a support adapted to be fixedly mounted to said vehicle, a set of acceleration sensing devices having mutually angulated input axes fixedly related to said support, a set of gyroscopes on said support, and computing means responsive to said gyroscopes and acceleration sensing devices for effecting compensation of said acceleration sensing devices in accordance with graviational acceleration and the cross product of angular and translational velocities of said support in inertial space.

References Cited in the file of this patent
UNITED STATES PATENTS

| | | |
|---|---|---|
| 2,487,793 | Esval | Nov. 15, 1949 |
| 2,606,448 | Norden | Aug. 12, 1952 |
| 2,631,455 | Wing | Mar. 17, 1953 |
| 2,638,288 | Hanna | May 12, 1953 |
| 2,649,264 | Slater, et al. | Aug. 18, 1953 |
| 2,672,334 | Chenery | Mar. 11, 1954 |
| 2,729,107 | Braddon | Jan. 3, 1956 |
| 2,752,792 | Draper | July 3, 1956 |
| 2,756,598 | Hammond | July 31, 1956 |
| 2,770,452 | Miller | Nov. 13, 1956 |
| 2,873,074 | Harris et al. | Feb. 10, 1959 |
| 2,932,467 | Scorgie | Apr. 12, 1960 |
| 2,936,627 | Wing et al. | May 17, 1960 |

OTHER REFERENCES

Aviation Week publication, "Inertial Guidance," copyright 1956, McGraw-Hill, page 10.

Introduction to Theoretical Mechanics by Becker, McGraw-Hill, 1954, pages 248 to 254.